Patented May 23, 1950

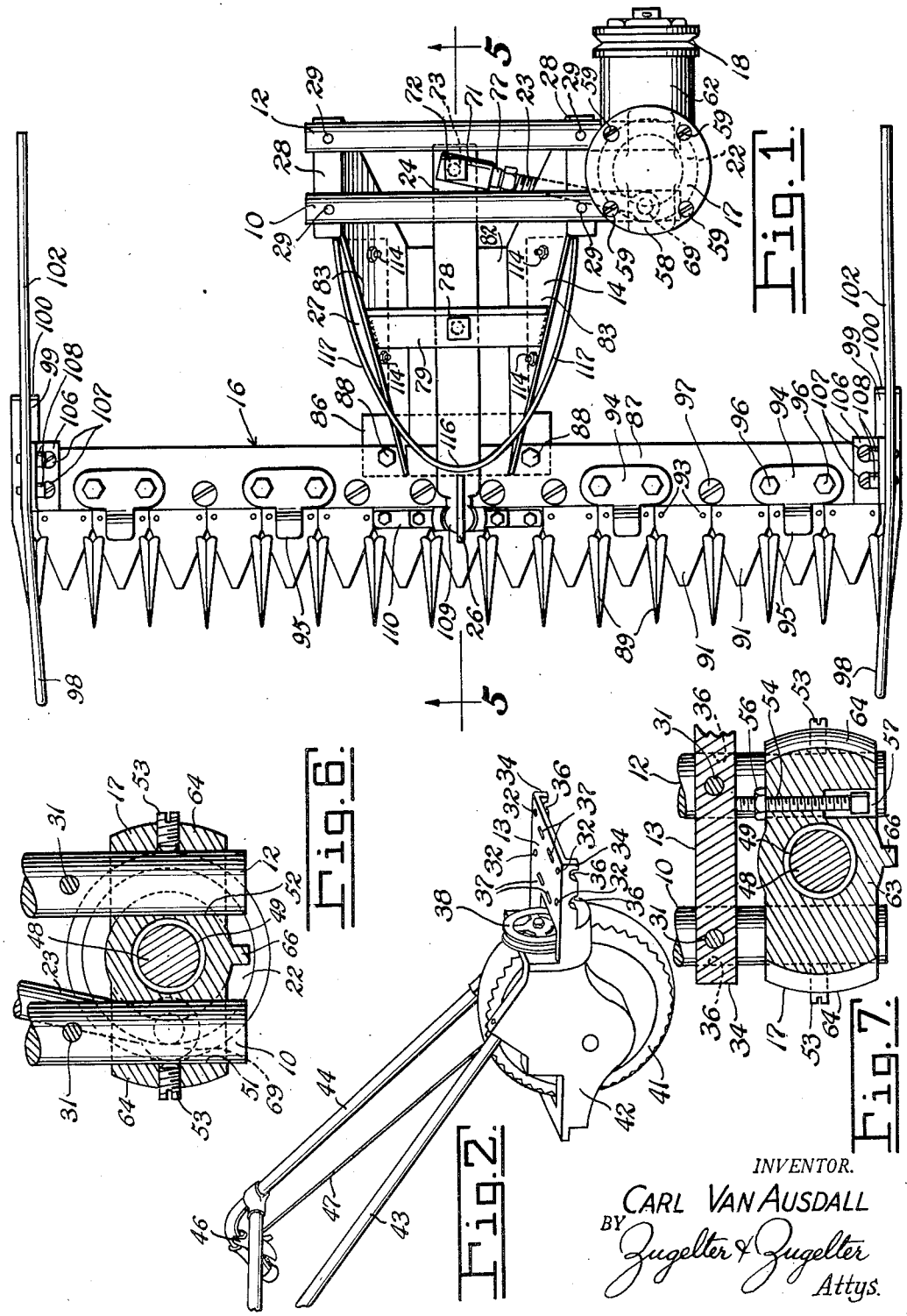

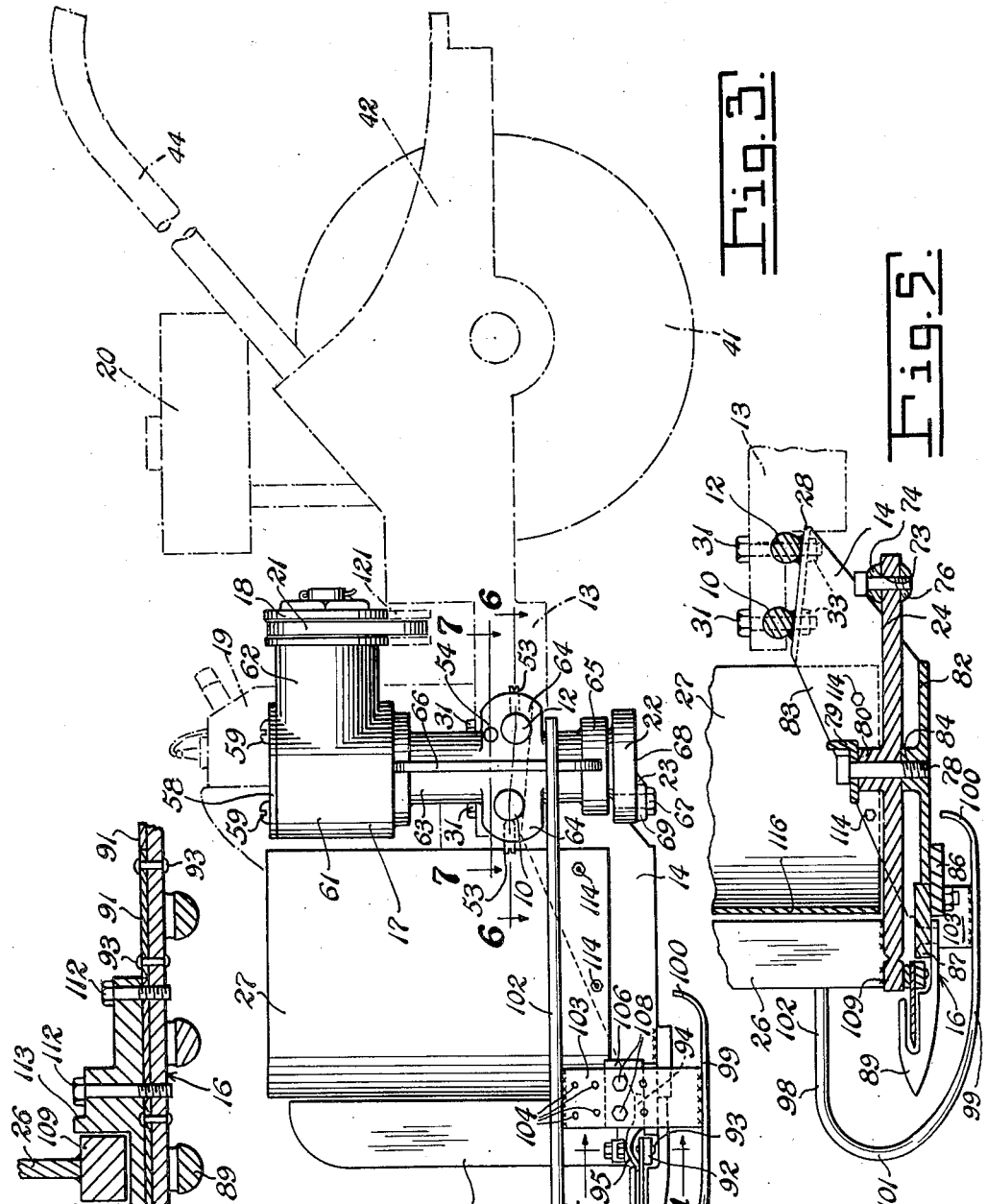

2,509,114

UNITED STATES PATENT OFFICE 2,509,114

SICKLE BAR ATTACHMENT

Carl Van Ausdall, Liberty, Ind.

Application July 17, 1948, Serial No. 39,281

3 Claims. (Cl. 56—26.5)

This invention relates to a sickle bar attachment for garden tractors and the like and more particularly relates to a mounting for a sickle bar attachment.

An object of this invention is to provide a mounting for attaching a sickle bar attachment to a garden tractor.

A further object of this invention is to provide a light weight, adjustable mounting for a sickle bar attachment.

A further object of this invention is to provide a sickle bar attachment which can readily be removed from a garden tractor to adapt the tractor for use with other tools.

A further object of this invention is to provide a shaker device for use with a mounting for a sickle bar attachment which can separate grass, weeds, and other cuttings from a sickle bar to clear a path for the garden tractor.

A further object of this invention is to provide a demountable sickle bar attachment which can be driven by a motor which drives the tractor.

A further object of this invention is to provide a belt driven sickle bar attachment having a simple and convenient means for adjusting tension of the belt drive.

The above and other objects may be attained by the means described herein and illustrated in the accompanying drawing, in which:

Figure 1 is a plan view of a sickle bar attachment constructed in accordance with this invention.

Figure 2 is a perspective view of a garden tractor to which the sickle bar attachment illustrated in Figure 1 may be attached, the tractor being shown with motor removed.

Figure 3 is a side elevational view of the attachment shown in Figure 1, the attachment being shown in position and attached to a garden tractor, the tractor being shown schematically in dot-dash lines.

Figure 4 is a sectional view along a line 4—4 in Figure 3.

Figure 5 is a sectional view along a line 5—5 in Figure 1.

Figure 6 is an enlarged sectional view along a line 6—6 in Figure 3.

Figure 7 is an enlarged view along a line 7—7 in Figure 3, the view being in section.

As shown in Figures 1 and 3, the sickle bar attachment includes a pair of transverse bars 10 and 12. The bars 10 and 12 may be removably attached to a motor mounting plate 13, which forms a part of a garden tractor. A main frame 14 is attached to the transverse bars 10 and 12 and links the bars to a sickle bar, indicated generally at 16. A gear housing 17 is slidable lengthwise of the bars 10 and 12. A pulley 18 projects from the transmission or gear housing 17. The pulley 18 may have its axis parallel to the direction of advance of the tractor and receives power from a motor 19, which also may drive the tractor. A belt 21, driven by a power take-off 121 on the motor 19, rotates the pulley 18. A fuel tank 20 supplies the motor 19. Tension in the belt 21 may be adjusted by moving the gear housing 17 along the bars 10 and 12. A wheel 22 at the lower end of the gear housing 17 is rotated by gearing (not shown) inside the gear housing 17 when the pulley 18 is turned. The wheel 22 actuates a pitman 23. The pitman 23, in turn, oscillates a rocker bar 24 that reciprocates the sickle bar 16. A shaker bar 26, which swings back and forth with the bar 24, can act to clear the path of the tractor and direct grass, weeds, and other cuttings from the sickle bar to either side of a guide 27. The guide 27 extends upwardly from the main frame 14 and outwardly on opposite sides of the shaker bar 26 to separate the cuttings on either side of the tractor.

The device described generally above will now be described in greater detail.

The bars 10 and 12 and a pair of outwardly extending lips 28 on the main frame 14 may be welded or otherwise firmly joined together. Bores 29 (Figure 1) through the bars 10 and 12 and through the lips 28 can receive bolts 31 (Figure 5) for attaching the sickle bar 16 to the motor mounting plate 13. The bolts 31 pass through bores 32 (Figure 2) in the motor mounting plate 13 and are held in place by nuts 33 (Figure 5). As shown in Figure 2, the motor mounting plate 13 may be equipped with downwardly extending lips 34 at either side of the plate 13, and semi-circular portions 36 of the lips 34 may be cut away to fit over the bars 10 and 12.

The motor mounting plate 13 is equipped with slots 37 upon which the motor 19, shown in dot-dash lines in Figure 3, may be mounted. The motor can drive a pulley 38 by means of a belt (not shown) and the pulley 38 can actuate a driving wheel 41 (Figure 2) by means of a transmission inside a casing 42. Handles 43 and 44 serve to guide the tractor. A control lever 46 and linkage 47 can control a clutch inside the casing 42 for starting and stopping the wheel 41.

The pulley 18 drives a vertical shaft 48 (Figures 6 and 7) by means of gearing of a conventional type (not shown) inside the gear housing 17. The gearing may be in the form of a pair of meshing bevel gears, one on the shaft 48 and the other driven by the pulley 18. The wheel 22 is attached to the lower end of the shaft 48 and rotates therewith. The shaft 48 rotates inside a vertical bore 49 in the gear housing 17. The gear housing 17 is additionally provided with horizontal bores 51 and 52 on opposite sides of and spaced from the vertical bore 49. The horizontal bores 51 and 52 slidably receive the bars 10 and 12. Set screws 53, threaded in the gear housing 17, can intersect the bores 51 and 52 for holding the bars 10 and 12 in place in the gear housing.

Tension in the belt 21 is adjusted by moving the gear housing 17 along the bars 10 and 12. An adjustment screw 54 is threaded in the gear housing 17 parallel to and spaced from the bores 51 and 52. The adjustment screw 54 can bear on one of the lips 34, as shown in Figure 7. The adjustment screw 54 serves to move the gear housing along the bars 10 and 12 for tightening the belt 21. A lock nut 56 can hold the adjustment screw 54 in position. The adjustment screw 54, as shown in Figures 3 and 7, may be of a socket head type, and the gear housing may contain a well 57 for receiving the head of the screw 54.

The gear housing 17 may be cast and may be machined in the usual manner to receive the vertical shaft 48, horizontal bars 10 and 12, adjustment screw 54, and appropriate gearing (not shown). A cap 58 at the upper end of the gear housing 17 affords access to the interior of the gear housing. The cap 58 is held in place by appropriate screws 59. As shown in Figure 3, the gear housing 17 is formed as a single piece and includes a central portion 61, a horizontal arm 62 for carrying the pulley 18, and a vertical arm 63 for receiving the shaft 48. A portion of the arm 63 is enlarged to include outwardly extending projections 64 for receiving the bars 10 and 12, the set screws 53, and the adjusting screw 54. The lower end of the vertical arm 63 is enlarged, as indicated at 65, for supporting the wheel 22. A vertical rib 66 on the outer side of the vertical arm 63 affords protection thereof against sidewise blows.

As is shown in Figures 1, 3, and 6, the wheel 22 is linked to the pitman 23 by a stud or crank pin 67. The stud 67 projects downwardly from a lower side 68 of the wheel 22. The stud 67 is spaced from the axis of the wheel, and the pitman 23 is actuated in the usual manner when the wheel 22 is rotated. A ring bearing 69 at one end of the pitman fits about the stud 67. The other end of the pitman 23 carries a clevis 71 for linking the pitman 23 to the main operating bar 24. The clevis 71 includes a bolt 72 which fits through a vertical bore 73 near an end of the bar 24. The bolt 72 is held by upper and lower jaws 74 and 76 respectively of the clevis 71 (Figure 5). As indicated in Figure 1, the clevis 71 is attached to the pitman 23 by an internally threaded sleeve 77, which is threaded on the pitman 23. The distance between the ring bearing 69 and the clevis 71 may be varied by turning the clevis 71 and sleeve 77 about the axis of the pitman 23 to vary the effective length of the pitman.

The bar 24 swings about a pivot bolt 78. The pivot bolt 78 passes through a transverse brace 79 and a bearing 80. The bearing 80 is located near the center of the bar 24. The threaded end of the bolt 78 is attached to the main frame 14. Opposite ends of the transverse brace 79 may be welded or otherwise firmly attached to the main frame. The bar 24 swings about the pivot bolt 78 inside the main frame 14.

As shown in Figure 1, the main frame 14 is substantially U-shaped. The main frame 14 includes a horizontal bottom wall 82 and upwardly extending side walls 83. The lips 28, to which the transverse bars 10 and 12 are attached, are formed from outwardly turned upper edges of the walls 83. The walls 83, as shown in Figure 5, may slope forwardly toward the sickle bar 16. Near the center of the bottom wall 82, a built up portion 84 is located which serves to receive the threaded end of the pivot bolt 78 and also acts as a bearing for supporting the bar 24 in spaced relation above the bottom wall 82 of the main frame. The transverse brace 79 runs between the walls 83 and is spaced above the bottom wall 82. The transverse brace may be formed from an angle and may be firmly attached to the side walls 83, as by welding.

The bottom wall 82 of the main frame is attached at its forward edge to a strengthening plate 86 by welding or other strong, durable means. As shown in Figure 1, the plate 86 may be bolted to a main cross member 87 of the sickle bar 16 by bolts 88. Forward ends of the side walls 83 may be cut away to fit over the cross member 87, as shown in Figure 5.

The general construction of the sickle bar 16 may be substantially similar to the construction of sickle bars in use. The sickle bar includes a series of stationary cutters 89 mounted at intervals along the cross member 87. Spaced teeth 91 are reciprocable inside the cutters 89, and the teeth 91 and cutters 89 cooperate to give a cutting action in the usual manner. Each of the teeth 91 may be attached to a reciprocating bar 92, as by rivets 93. A series of hold down plates 94 prevent the reciprocating bar 92 and teeth 91 from coming free from the cutters 89. Each of the hold down plates 94 has a forwardly extending finger 95 which extends above the teeth 91, and the fingers 95 are arched to clear the rivets 93. The plates 94 and certain of the cutters 89 may be held in place upon the cross member 87 by bolts 96, while the remainder of the cutters 89 are held in place by screws 97.

At either end of the cross member 87 are mounted U-shaped guides 98. Each guide may be made from a piece of rod stock bent to the shape shown and includes a lower horizontal member 99 for resting on the ground to determine the height of cut to be made. As shown in Figure 1, the horizontal member 99 may be flattened to slide over the ground, and a rear end thereof may be turned upwardly as indicated at 100. A forward end of the guide 98 may be turned upwardly, as indicated at 101, and then rearwardly to form an upper horizontal member 102. The upper and lower horizontal members 99 and 102 are linked by a vertical plate 103. The plate 103 is equipped with vertically spaced pairs of openings 104. An angle iron 106 is attached by screws to an end of the cross member 87. The plate 103 is attached to the angle iron 106 by screws 108 which pass through one of the pairs of openings 104 into the angle iron 106. As will be understood, the guide 98, which has been described, is duplicated at opposite ends of the sickle bar 16. The height of the cut to be made by the sickle bar may be varied by suitable choice of pairs of openings 104.

The reciprocating bar 92 is linked to the bar 24 by means of a linkage shown most clearly in Figures 4 and 5. The free end of the bar 24 is provided with a substantially cylindrical bearing 109. The bearing 109 may be rotatably received in an opening in a bracket 110. The bracket 110 in turn is attached to the reciprocating bar 92 by bolts 112 (Figure 4) which are threaded in the reciprocating bar. The central part of the bracket 110 is built up, as indicated at 113, to receive the bearing 109. As the bar 24 oscillates, the bearing 109 can rotate inside the opening in the bracket 110, and the reciprocating bar 92 is moved back and forth to provide a cutting action.

The shaker bar 26 is attached to and extends upwardly from the cylindrical bearing 109 and from the part of the bar 24 adjacent the bearing 109. The shaker bar 26 acts to separate cuttings from the sickle bar 16 into two portions so that the portions may be left on either side of the tractor. The guide 27 is mounted immediately behind the shaker bar 26 for further guiding the portions of cuttings away from the bar 24 and from the tractor. As shown in Figures 1 and 3, the guide 27 is attached to the main frame 14 by bolts 114. The guide 27, as shown in Figure 1, may have a forward portion 116 which is curved so that the shaker bar 26 follows substantially the curvature of the forward portion 116. The shaker bar 26 may be plate-like in character and extends substantially radially of the forward portion 116 so that the shaker bar sweeps the forward portion 116. The guide 27 extends rearwardly from the portion 116 to form opposite sides 117. The main frame and the guide, in combination, protect the operating mechanism and form a housing about the pivot bolt 78, bearing 80, and clevis 71 to protect the bearing and clevis from cuttings.

The operation of the sickle bar attachment will be clear from the foregoing detailed description and from the drawings. The transverse bars 10 and 12 are attached to the motor mount 13 by the bolts 31 when the sickle bar attachment is to be used. The belt 21 is placed about the pulley 18 and the power take off 121 of the motor 19. The tension in the belt may be adjusted, if necessary, by releasing the set screws 53 and then turning the adjustment screw 54 a sufficient amount to provide proper belt tension. Then the lock nut 56 and the set screws 53 may be tightened to hold the transmission or gear housing 17 in place upon the transverse bars 10 and 12. If necessary, the sleeve 71 is rotated about the axis of the pitman 23 to adjust the effective length of the pitman 23 for proper centering of the teeth 91 with respect to the cutters 89. Finally, the height of the cut may be adjusted by removing the screws 108 and replacing them through appropriate openings 104 for setting the cutters 89 and reciprocating teeth 91 at a proper height. Then the attachment is ready for use.

When the pulley 18 is rotated, the pitman 23 swings the bar 24 about the pivot bolt 78 to move the teeth 91 back and forth inside the cutters 89. At the same time, the shaker bar 26 swings back and forth to separate the cuttings into two portions. The cuttings pass on either side of the guide 27 and do not reach the pivot bolt 78 and clevis 71. When desired, the sickle bar attachment may readily be detached from the motor mount 13 by removing the bolts 31 and disconnecting the belt 21. Then the tractor may be used for operating other attachments.

The sickle bar attachment of this invention is readily mountable and removable without the need for special tools. It is readily adjustable to provide proper tension in the driving belt. The shaker bar 26 and guide 27 maintain a clear path before the motor mount and protect the pivot bolt 78 and clevis 71 from clippings.

The parts of the attachment may be made of cast, forged, or stamped parts of any appropriate material. Many variations in details of construction will be apparent, and the invention is not intended to be limited by the foregoing detailed description and the drawings except as set out in the appended claims.

What is claimed is:

1. A sickle bar attachment for a garden tractor having a power take-off for driving a belt, said attachment comprising a frame, a pair of spaced substantially parallel bars attached to the rear of said frame, means for attaching said bars to the forward end of the tractor transversely of the tractor, a sickle bar attached to the forward end of said frame, said sickle bar having a reciprocating sickle thereon, a transmission housing slidably mounted on said bars, a pulley rotatably mounted on said housing and adapted to be driven by means of a belt running on the pulley and on the power take-off, means for adjustably positioning said housing on said bars for adjusting tension in said belt, a crank mounted on the underside of said housing and coupled to said pulley to be driven thereby, a rocker bar pivotally mounted medially of its ends upon the frame and extending substantially perpendicular to the path of movement of said sickle and having one end thereof operatively connected to said sickle, a pitman operatively connected at one end to said crank and at the other to said rocker bar, whereby when the pulley is turned, the rocker bar is oscillated by the pitman and reciprocates the sickle, and means for adjusting the length of the pitman.

2. A sickle bar attachment in accordance with claim 1 characterized by the fact that an adjustment screw is provided that extends through the housing parallel to the parallel bars and bears on the framework of the tractor to hold the housing in adjusted position upon the parallel bars.

3. A sickle bar attachment for a tractor comprising a frame having a bottom plate and an upwardly extending frame member at each side of and secured to said plate, said plate having at its forward end a sickle bar and sickle, a pair of spaced parallel bars extending across the rear portion of said frame and spaced upwardly from the bottom plate thereof, said bars being secured to the side frame members and adapted to be secured to a tractor frame, said bars having end portions overhanging one of said side frame members, a rocker bar pivotally mounted on said plate at a point between the forward and rear ends thereof, means connecting the forward end of said rocker bar to the sickle whereby the sickle is reciprocated as the rocker bar is oscillated, a transmission having a housing provided with bores spaced to receive the overhanging end portions of said parallel bars whereby the transmission is slidable thereon towards or away from said frame, said transmission having a vertical shaft therein provided with a crank at its lower end at a location below said parallel bars, a horizontal shaft in the upper portion of said housing and at right angles to said parallel bars, said horizontal and vertical shafts being drivingly coupled, a pulley on said horizontal shaft adapted for belt connection to a tractor motor, a pitman connecting said crank and rocker bar, means for adjusting the length of the pitman in accordance with the position of the transmission on said parallel bars, and means for locking the transmission against movement on said bars in the direction of the pull of the belt on said pulley.

CARL VAN AUSDALL.

REFERENCES CITED

The following references are of record in the file of this patent:

UNITED STATES PATENTS

| Number | Name | Date |
|---|---|---|
| 1,329,645 | Warrener | Feb. 3, 1920 |
| 1,587,862 | Rutishauser et al. | June 8, 1926 |
| 1,894,312 | Harman | Jan. 17, 1933 |
| 2,106,641 | Leitch | Jan. 25, 1938 |
| 2,335,541 | Ronning | Nov. 30, 1943 |
| 2,368,290 | Donald | Jan. 30, 1945 |
| 2,448,078 | Brown | Aug. 31, 1948 |